(12) United States Patent
Han et al.

(10) Patent No.: US 9,395,249 B2
(45) Date of Patent: Jul. 19, 2016

(54) WIDE RANGE TEMPERATURE CONTROL SYSTEM FOR SEMICONDUCTOR MANUFACTURING EQUIPMENT USING THERMOELECTRIC ELEMENT

(71) Applicant: Techest Co., Ltd., Gyeonggi-do (KR)

(72) Inventors: Min Jin Han, Gyeonggi-do (KR); Jae Geon Kim, Gyeonggi-do (KR)

(73) Assignee: TECHEST CO., LTD., Gyeonggi-Do (KR)

( * ) Notice: Subject to any disclaimer, the term of this patent is extended or adjusted under 35 U.S.C. 154(b) by 421 days.

(21) Appl. No.: 14/018,382

(22) Filed: Sep. 4, 2013

(65) Prior Publication Data

US 2014/0072015 A1    Mar. 13, 2014

(30) Foreign Application Priority Data

Sep. 5, 2012  (KR) .................. 10-2012-0098303

(51) Int. Cl.
*G01K 7/02* (2006.01)
*G05D 23/19* (2006.01)

(52) U.S. Cl.
CPC .............. *G01K 7/02* (2013.01); *G05D 23/1919* (2013.01)

(58) Field of Classification Search
CPC ..... G01K 7/02; G05D 23/1919; G05D 23/19; H01L 23/38; H01L 27/00
USPC .......................................... 374/179, 163, 166
See application file for complete search history.

(56) References Cited

U.S. PATENT DOCUMENTS

| | | | | |
|---|---|---|---|---|
| 3,240,261 A | * | 3/1966 | Morales .................. | F25B 21/02 126/362.1 |
| 6,338,251 B1 | * | 1/2002 | Ghoshal ............. | B60H 1/00478 257/E23.082 |
| 2002/0029877 A1 | * | 3/2002 | Cowans ................. | B23Q 11/10 165/206 |
| 2003/0100137 A1 | * | 5/2003 | Venkatasub-ramanian ................ | F25B 21/02 438/64 |
| 2007/0057076 A1 | * | 3/2007 | Orozco ................... | G05D 23/22 236/1 C |
| 2008/0093057 A1 | * | 4/2008 | Choi ................. | H01L 21/67109 165/104.33 |
| 2009/0044752 A1 | * | 2/2009 | Furuya .............. | C23C 16/45572 118/723 E |
| 2009/0205342 A1 | * | 8/2009 | Jang ................... | B60H 1/00478 62/3.3 |
| 2010/0154438 A1 | * | 6/2010 | Bean, Jr. ............ | H05K 7/20818 62/3.63 |
| 2012/0111028 A1 | * | 5/2012 | Campbell ............... | F25B 40/00 62/3.7 |

FOREIGN PATENT DOCUMENTS

KR    10-0817419 B1    3/2008

* cited by examiner

*Primary Examiner* — Lisa Caputo
*Assistant Examiner* — Philip Cotey
(74) *Attorney, Agent, or Firm* — Rabin & Berdo, P.C.

(57) ABSTRACT

A wide range temperature control system for semiconductor manufacturing equipment uses a thermoelectric element applied to a chiller that is a temperature control device for semiconductor manufacturing equipment. The refrigerant circulated through a refrigerant tank passes through thermoelectric element block groups and is cooling and heating controlled, outputs of the thermoelectric element block groups are then supplied to a load, a heat exchanger using process cooling water (PCW) is configured in the refrigerant tank in which the refrigerant recirculated from a working load is stored, a heater for high temperature heating is further configured, some of the thermoelectric element block groups at a high temperature are bypassed through a variable valve, the polarity of a voltage is reversed in the thermoelectric element block groups through which a high-temperature refrigerant passes, and a part of an insulating element adjacent to the refrigerant is maintained at a lower temperature than the refrigerant.

19 Claims, 8 Drawing Sheets

WIDE RANGE TEMPERATURE CONTROL SYSTEM FOR SEMICONDUCTOR MANUFACTURING EQUIPMENT USING THERMOELECTRIC ELEMENT

CROSS-REFERENCE TO RELATED APPLICATION

This application claims priority to and the benefit of Korean Patent Application No. 2012-0098303, filed on Sep. 5, 2012, the disclosure of which is incorporated herein by reference in its entirety.

BACKGROUND

1. Field of the Invention

The present invention relates to a wide range temperature control system for semiconductor manufacturing equipment using a thermoelectric element, and more particularly, to a wide range temperature control system for semiconductor manufacturing equipment using a thermoelectric element, whereby the thermoelectric element is applied to a chiller that is a temperature control device for semiconductor manufacturing equipment so as to precisely control a refrigerant in a cooled or heated state and furthermore, temperature control can be performed in a high temperature region that cannot be dealt with by an existing temperature control system using a thermoelectric element so that energy efficiency can be maximized

2. Discussion of Related Art

As semiconductor device technology is gradually enhanced, control precision of equipment applied to semiconductor manufacturing equipment also becomes important. A basic device of semiconductor manufacturing equipment is a chiller for controlling a temperature of semiconductor manufacturing equipment.

The chiller of semiconductor manufacturing equipment heats or cools a refrigerant so as to control the temperature of the refrigerant. According to the related art, various heaters and cooling units have been applied to the chiller so as to control the temperature of the refrigerant.

In a basic configuration of the chiller, the refrigerant is circulated by a circulation unit such as a pump and is provided to a working load. The refrigerant, of which a temperature is changed due to an action by the working load, is heated or cooled using a heater or a cooling device so that the temperature of the refrigerant is made uniform and the refrigerant is stored in and provided from a refrigerant tank.

The cooling device that is essentially included in the configuration of the chiller according to the related art mainly uses a mechanical method. Thus, the volume of the cooling device is large and noise and vibration thereof are severe. Thus, a method using a thermoelectric element that has less noise and a small size and that can be precisely controlled electronically is being used.

Such a thermoelectric element mainly uses a well known Peltier element and is capable of directly converting thermal energy into electric energy or converting electric energy into thermal energy. Thus, the thermoelectric element can be efficiently cooled with a relatively simple configuration and thus is mainly used for the purpose of cooling.

In general, the thermoelectric element includes a heat absorption surface and a heat dissipation surface and moves heat from the heat absorption face to the heat dissipation surface so that cooling can be performed. Since the thermoelectric element can also perform heating by reversing a thermoelectric direction, the thermoelectric element may also be used in both heating and cooling.

However, when cooling and heating are simultaneously performed by a single thermoelectric element, a situation in which the polarity of the single thermoelectric element varies so as to perform desired temperature control occurs frequently. Since there is a risk that the thermoelectric element may be destroyed and a hysteresis region may widen, it is difficult to perform precise control, and it is not easy to perform digital control using pulse. Also, when the single thermoelectric element converts heating and cooling, an appropriate heat-exchanging unit must be further configured, which causes the single thermoelectric element that can be used in both heating and cooling to be difficult to introduce.

In order to solve these problems, the present applicant has proposed a temperature control system in which a polarity of a thermoelectric module is changed into a cooling or heating mode, linear control information is obtained as an analog value through a proportional, integral and differential (PID) operation and then information corresponding to the polarity is managed in a digital manner and a control amount is managed as an absolute value of an analog output so that hysteresis can be minimized and a single thermoelectric element can be used in both cooling and heating, as disclosed in Korean Patent Registration No. 10-0817419.

For example, FIG. 1 illustrates an example of a temperature control system for semiconductor manufacturing equipment using polarity conversion of a thermoelectric element. As illustrated in FIG. 1, the temperature control system for semiconductor manufacturing equipment includes a controller 10 that applies a control signal indicating whether a voltage is supplied to a thermoelectric element 51 or a polarity of the thermoelectric element 51 is converted so as to control the temperature of the semiconductor manufacturing equipment to a setting temperature, a polarity converter 30 that converts and filters a supplied current according to the control signal of the controller 10 and converts the polarity of the thermoelectric element 51 into a positive or negative polarity so as to supply the current to a thermoelectric element (TEM) block 50, the thermoelectric element (TEM) block 50 on which a refrigerant passing through a refrigerant flow passage 52 is cooled or heated by the thermoelectric element 51 installed in the TEM block 50 using the current supplied from the polarity converter 30, and a refrigerant tank 60 that stores the cooled or heated refrigerant and supplies the cooled or heated refrigerant to a working load 4 through a circulation unit 65. When a cooling or heating operation is performed by the thermoelectric element 51, an opposite surface to a surface in which the refrigerant is cooled or heated is stabilized through a process cooling water (PCW) flow passage 31.

The controller 10 compares the temperature of the working load 4 with a predetermined setting temperature, determines whether the refrigerant is cooled or heated due to the working load 4 and applies a control signal indicating whether a voltage is supplied to the thermoelectric element 51 or the voltage is a positive or negative voltage to the polarity converter 30 based on the result of determination.

The polarity converter 30 generates and provides power to the TEM block 50 according to the control signal applied by the controller 10. The polarity converter 30 includes a DC power unit 40 that generates and provides a DC voltage required for driving, a voltage controller 20 that generates power of the DC power unit 40 as a voltage having a predetermined magnitude and a predetermined polarity according to control of the controller 10, and a voltage applying unit 31 that provides the voltage having the predetermined size and the predetermined polarity provided by the voltage controller 20 to the TEM block 50.

The controller 10 calculates the control amount using a PID operation and transfers polarity information and control amount information to the voltage applying unit 31 via the voltage controller 20. Thus, the voltage applying unit 31 controls an output to be provided to the TEM block 50.

Through this configuration, both cooling and heating can be performed on a single thermoelectric element block, durability and control precision of the thermoelectric element is improved so that the temperature control system can be manufactured to have a light weight and a small size, manufacturing costs can be reduced and maintenance can be simplified.

However, as semiconductor processes have recently diversified, the setting temperature of the refrigerant applied to the working load is out of the existing thermoelectric element response range (−10° C. to 60° C.) and is enlarged in a high temperature range (for example, 90° C. or more). However, when the thermoelectric element is used as a unit for varying the temperature of the refrigerant, a controllable temperature range is limited to about 60° C. or less due to a limitation in the thermoelectric element having a semiconductor structure. When heating and cooling are controlled using only the thermoelectric element so as to deal with a change of a setting temperature in a wide temperature control range within a limited response time, a response rate is decreased, and control may be unstable in a region close to a target temperature.

FIG. 2 illustrates an example of a heating method using a thermoelectric element block. A thermoelectric element block 100 is configured in such a way that a thermoelectric element 105 surrounds a flow passage 101 of a refrigerant so as to improve the efficiency of the thermoelectric element 105, and cold air in a heat absorption surface that is generated when a heating operation of the thermoelectric element 105 is performed is discharged via PCW flow passages 102 and 103.

As a result, the thermoelectric element 105 must be controlled at a higher temperature than the refrigerant so as to heat the refrigerant. For example, the thermoelectric element 105 must be controlled to a temperature of 110° C. or more so as to heat the refrigerant to 90° C. However, due to characteristics of the thermoelectric element 105, when the thermoelectric element 105 is at 60° C. or more, the thermoelectric element 105 is rapidly deteriorated. Thus, it is difficult to use the thermoelectric element 105 to control a temperature range of 60° C. or more.

Furthermore, since an electronic chiller having the above configuration maintains the temperature of a working load using a refrigerant, a control manipulation amount for varying the temperature of a large amount of refrigerant is actually larger than a temperature control amount to be controlled. That is, a control manipulation amount for controlling a narrow temperature control range increases considerably. Thus, even though a response property is improved by reducing the size of hysteresis through linear control by PID control and polarity control, control must first be performed with a large value for a narrow temperature control range. Thus, when cooling and heating are performed using a single thermoelectric element, a PID output amount and polarity for maintaining a desired temperature vary frequently. For example, even when a value that is 1° C. different from the desired temperature is detected, temperature control of the thermoelectric element can be performed within a desired control time at which the thermoelectric element must be changed to a temperature that is several times the desired temperature so as to adjust the different value to the desired temperature. In order to adjust the desired temperature, temperature control must be performed by varying cooling and heating. A voltage having a large value crosses different polarities and is applied to the thermoelectric element. This causes the life span of the thermoelectric element to be reduced, and the desired temperature not to converge on the target temperature but to continuously vary due to polarity crossing of a large control amount. A control unstable region in which a control output and an actual temperature vary for a relatively long time in the vicinity of the desired temperature is referred to as a dead zone.

As a temperature range to be controlled increases, the range of a setting temperature increases and a control manipulation amount increases, and thus control instability in the dead zone becomes severe.

As a result, a chiller using a new method whereby an effective response to a wide temperature control range including a high temperature region can be performed while using a thermoelectric element that is capable of performing precise temperature control, unstable control caused by the dead zone can be prevented and a power-saving operation can be performed in consideration of energy efficiency is required.

PRIOR ART DOCUMENT

Patent document (Patent document 1) Korean Patent Registration No. 10-0817419

SUMMARY OF THE INVENTION

The present invention is directed to a wide range temperature control system for semiconductor manufacturing equipment using a thermoelectric element, whereby a circulation configuration of a refrigerant is modified in such a way that the refrigerant circulated through a refrigerant tank passes through a plurality of thermoelectric element block groups and is cooling and heating controlled, outputs of the plurality of thermoelectric element block groups are then supplied to a load, a heat exchanger using process cooling water (PCW) is configured in the refrigerant tank in which the refrigerant recirculated from a working load is stored, a heater for high temperature heating is further configured, some of the plurality of thermoelectric element block groups at a high temperature are bypassed through a variable valve, the polarity of a voltage is reversed in the thermoelectric element block groups through which a high-temperature refrigerant passes, and a part of an insulating element adjacent to the refrigerant is maintained at a lower temperature than the refrigerant so that high temperature control can be performed while the thermoelectric element is used and the thermoelectric element is not deteriorated even by the high-temperature refrigerant.

The present invention is also directed to a wide range temperature control system for semiconductor manufacturing equipment using a thermoelectric element, whereby a temperature control range is divided into a plurality of regions and then a control object to be heated or cooled in each of the plurality of regions is changed to cause a control state of each control object to be close to proportional, integral and differential (PID) control having no dead zone so that control performance can be improved.

The present invention is also directed to a wide range temperature control system for semiconductor manufacturing equipment using a thermoelectric element, whereby temperature stabilization is first performed using a heat exchanger configured in a refrigerant tank and then precise temperature control is performed using the thermoelectric element to enable a power-saving operation so that energy efficiency can be improved.

The present invention is also directed to a wide range temperature control system for semiconductor manufacturing equipment using a thermoelectric element, whereby a degree of bypass of some of a plurality of thermoelectric element block groups is adjusted by PID control of a variable valve so that the thermoelectric element block groups can be used as an auxiliary heat exchanger to improve a temperature stabilization velocity without providing outputs of the thermoelectric element block groups in which much energy is consumed and temperature control can be performed so that control performance and energy efficiency can be improved.

The present invention is also directed to a wide range temperature control system for semiconductor manufacturing equipment using a thermoelectric element, whereby a heat exchanger of a refrigerant tank operates so as to compensate for a rise of the temperature of a refrigerant caused by a circulation unit including a pump for circulating the refrigerant without consuming outputs of a plurality of thermoelectric element block groups so that a power-saving operation can be performed.

According to an aspect of the present invention, there is provided a wide range temperature control system for semiconductor manufacturing equipment using a thermoelectric element, including: a refrigerant tank that collects a refrigerant recirculated from a working load in the semiconductor manufacturing equipment; a heat exchanger that is configured in the refrigerant tank and performs heat-exchanging with the refrigerant collected using process cooling water (PCW); a heater that is configured in the refrigerant tank; a circulation unit that circulates the refrigerant collected in the refrigerant tank; a first thermoelectric element block group and a second thermoelectric element block group to which the refrigerant circulated through the circulation unit is sequentially applied and which control a temperature of the refrigerant so that the refrigerant is able to be provided to the working load; a refrigerant variable valve that varies a refrigerant path so as to provide the refrigerant passing through the first thermoelectric element block group to the second thermoelectric element block group or to bypass the second thermoelectric element block group; and a temperature controller that divides a temperature control region into a plurality of regions and controls an operation of the heat exchanger and an output of the heater and polarities and outputs of the first and second thermoelectric element block groups according to the divided temperature control region in a different manner based on a setting temperature and an actual temperature of the working load, wherein, when a control temperature is a high temperature of more than a pre-set temperature, the temperature controller performs temperature control using the heater and the heat exchanger and a first thermoelectric element block, bypasses a second thermoelectric element block through the refrigerant variable valve and reverses a polarity of a control voltage applied to a thermoelectric element of the first thermoelectric element block so as to fix the thermoelectric element of the first thermoelectric element block.

The pre-set temperature for determining a high temperature may be 60° C.

When the pre-set temperature is lower than an actual temperature, the temperature controller may stabilize a temperature of the refrigerant using the heat exchanger and may perform temperature control using at least one of the first thermoelectric element block group and the second thermoelectric element block group.

The temperature controller may use the second thermoelectric element block group as an auxiliary heat exchanger for assisting a function of the heat exchanger by using the refrigerant variable valve. The temperature controller may control an opening/closing amount of the refrigerant variable valve using at least one of PID operations and may perform heat exchanging that exceeds a capacity of the heat exchanger through the second thermoelectric element block group, and in this case, a thermoelectric element of the second thermoelectric element block group may reverse a polarity of a control voltage and may be fixed in a cooled state.

In a pre-set control temperature range, the temperature controller may perform a power-saving operation so as to compensate for a rise of a temperature of the refrigerant caused by the circulation unit by operating the heat exchanger.

In a high temperature region of more than the pre-set temperature, the temperature controller may use a heater during heating and may use the heat exchanger and the first thermoelectric element block group for cooling. For the cooling, the second thermoelectric element block group may be fixed to a cooling polarity having no output and may be further used as an auxiliary heat exchanger that supplements a capacity of the heat exchanger through the refrigerant variable valve.

According to another aspect of the present invention, there is provided a wide range temperature control system for semiconductor manufacturing equipment using a thermoelectric element, including: a refrigerant tank that collects a refrigerant recirculated from a working load in the semiconductor manufacturing equipment, performs temperature stabilization so that a temperature of the refrigerant is able to be close to a target temperature using a heat exchanger using process cooling water (PCW) configured in the refrigerant tank and selectively performs heating for the target temperature using a heater configured in the refrigerant tank; a first thermoelectric element block group, which cools or heats the refrigerant collected in the refrigerant tank and in which a control voltage applied to the first thermoelectric element block group is fixed to a reversed polarity at a pre-set temperature or more; and a second thermoelectric element block group that causes the refrigerant passing through the first thermoelectric element block group to pass at the pre-set temperature or less, cools or heats the refrigerant to provide the cooled or heated refrigerant to a working load and that bypasses at least a part of the refrigerant at the pre-set temperature or more.

The pre-set temperature may be 60° C.

When a setting temperature of the refrigerant to be applied to the working load is lower than an actual temperature, the heat exchanger in the refrigerant tank may operate and may stabilize a temperature of the refrigerant, and after the temperature of the refrigerant is stabilized, the heat exchanger in the refrigerant tank may perform temperature control at the setting temperature using at least one of the first thermoelectric element block group and the second thermoelectric element block group.

When a capacity of the heat exchanger in the refrigerant tank is insufficient during cooling control, a degree of bypass of the second thermoelectric element block group that bypasses the refrigerant may be adjusted so that the second thermoelectric element block group is able to be used as an auxiliary heat exchanger for assisting a function of the heat exchanger. A control voltage applied to a thermoelectric element of the second thermoelectric element block group may be fixed to a reversed polarity, and the thermoelectric element of the second thermoelectric element block group may be in a cooling dedicated state. When the second thermoelectric element block group is used as an auxiliary heat exchanger, the second thermoelectric element block may not provide an output.

In a high temperature region of more than the pre-set temperature, a heater may be used during heating, and the heat exchanger and the first thermoelectric element block group may be used for cooling. For the cooling, the second thermoelectric element block group may be fixed to a cooling polarity having no output, may cause the refrigerant to pass through the second thermoelectric element block group via a refrigerant variable valve that adjusts a degree of bypass of the refrigerant of the second thermoelectric element block group and may be further used as an auxiliary heat exchanger that supplements a capacity of the heat exchanger.

At the pre-set temperature or less, the first thermoelectric element block group and the second thermoelectric element block group may perform a heating or cooling operation in the same mode. However, even at the pre-set temperature or less, when a difference between the setting temperature and an actual temperature is greater than or equal to a predetermined size, a rapid temperature rise or drop may be dealt with using the heater or the heat exchanger.

The wide range temperature control system may further include a circulation unit for circulating the refrigerant between the refrigerant tank and the first thermoelectric element block group, wherein the heat exchanger operates and performs a power-saving operation so as to compensate for a rise of a temperature of the refrigerant caused by the circulation unit in a pre-set control temperature range.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
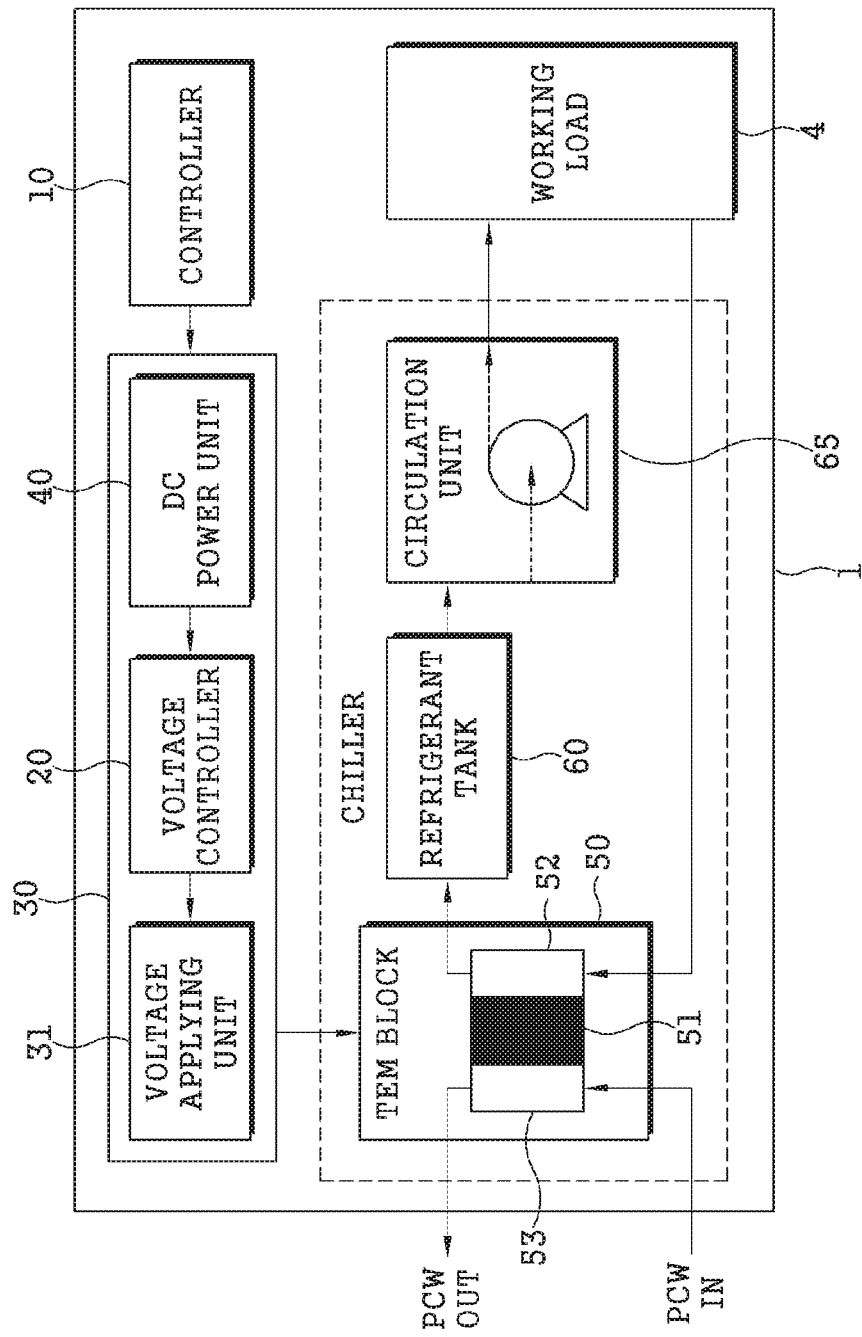
FIG. 1 is a view illustrating a configuration of an electronic chiller using a thermoelectric element polarity conversion method according to the related art.
Figure 2:
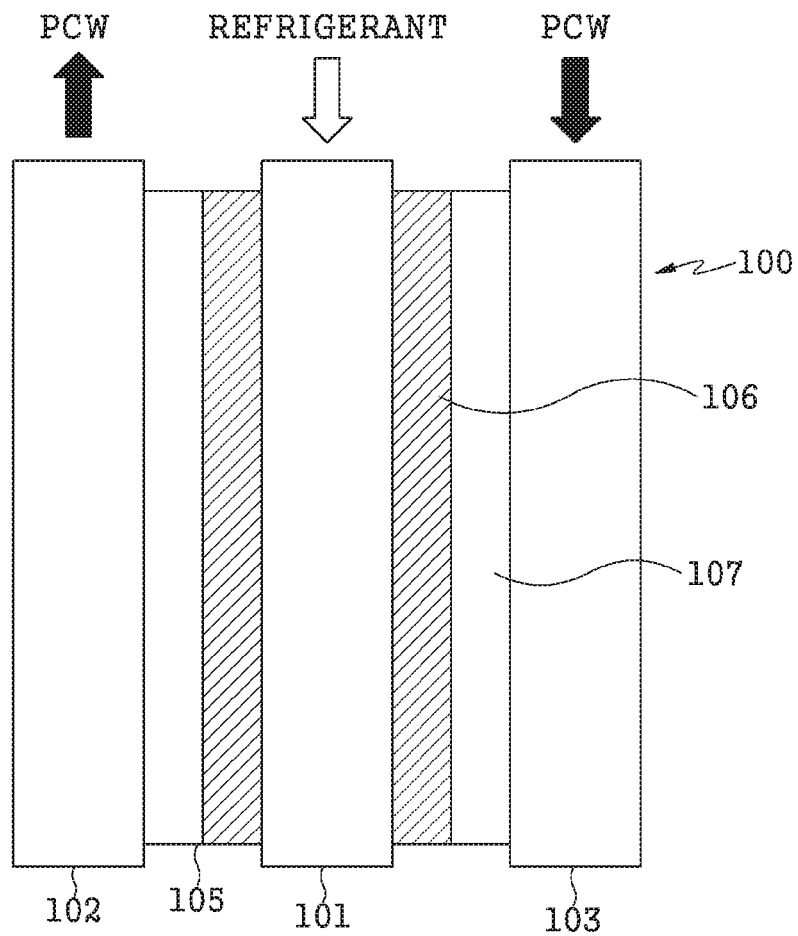
FIG. 2 is a conceptual view for explaining a limitation of heating caused by a method of operating a thermoelectric element block.

First, in the present invention, unlike the existing electronic chiller illustrated in FIG. 1, a circulation configuration of a refrigerant is modified in such a way that a refrigerant recirculated from a working load is collected through a refrigerant tank, and is circulated to cause the refrigerant that is cooling and heating controlled by a plurality of thermoelectric element block groups to be supplied to the working load.

That is, the recirculated refrigerant is first collected in the refrigerant tank so that a primary heat-exchanging operation can be performed in the refrigerant tank, thereby improving energy efficiency, high temperature control of 60° C. or more at which the thermoelectric element is deteriorated is performed through the refrigerant tank, and the recirculated refrigerant passes through a thermoelectric element block in an appropriate state and is provided to the working load.

First, in the present invention, a heat exchanger and a heater are configured in the refrigerant tank so as to deal with a high temperature region of 60° C. or more that cannot be heated by the thermoelectric element block.

Figure 3:
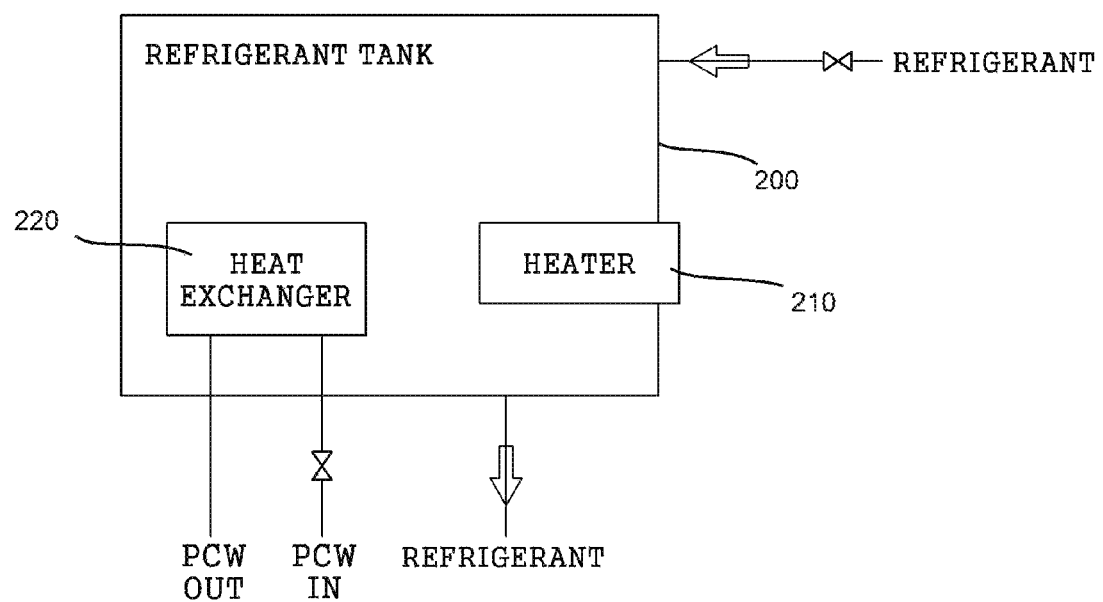
FIG. 3 is a view illustrating a configuration of a refrigerant tank according to an embodiment of the present invention.

FIG. 3 is a view illustrating a configuration of a refrigerant tank according to an embodiment of the present invention. As illustrated in FIG. 3, a heat exchanger 220 that may cool a refrigerant collected using process cooling water (PCW) and a heater 210 that may heat the refrigerant at a high temperature are configured in a refrigerant tank 200 in which the refrigerant collected from a working load is stored.

The heat exchanger 220 in the refrigerant tank 200 may provide considerably high heat-exchanging efficiency through a well known configuration. For example, the heat exchanger 220 in the refrigerant tank 200 may use a configuration of a heat exchanger disclosed in Korean Patent Registration No. 10-1065734 registered by the present applicant, and the configuration of the heat exchanger is also applied to a thermoelectric element block that will be described below so that the thermoelectric element block can be used as an effective heat exchanger.

The heat exchanger 220 may control its usage and a heat-exchanging level by controlling a variable valve for controlling supply of the PCW. The variable valve may be controlled using at least a part of proportional, integral and differential (PID) control as needed.

An output of the refrigerant tank 200 having a function of heating in a high temperature region and a cooling function is provided to thermoelectric element blocks through a circulation unit, such as a pump, so that electric control in a general temperature control region (for example, −10° C. to 60° C.) can be performed.

However, in the case of a thermoelectric element block in which a high-temperature refrigerant is circulated, the temperature of a thermoelectric element is required to be maintained at a lower temperature than the refrigerant, and units for preventing a temperature drop of the high-temperature refrigerant that passes through the thermoelectric element block that operates as a heat exchanger are required to be provided.

Figure 4:
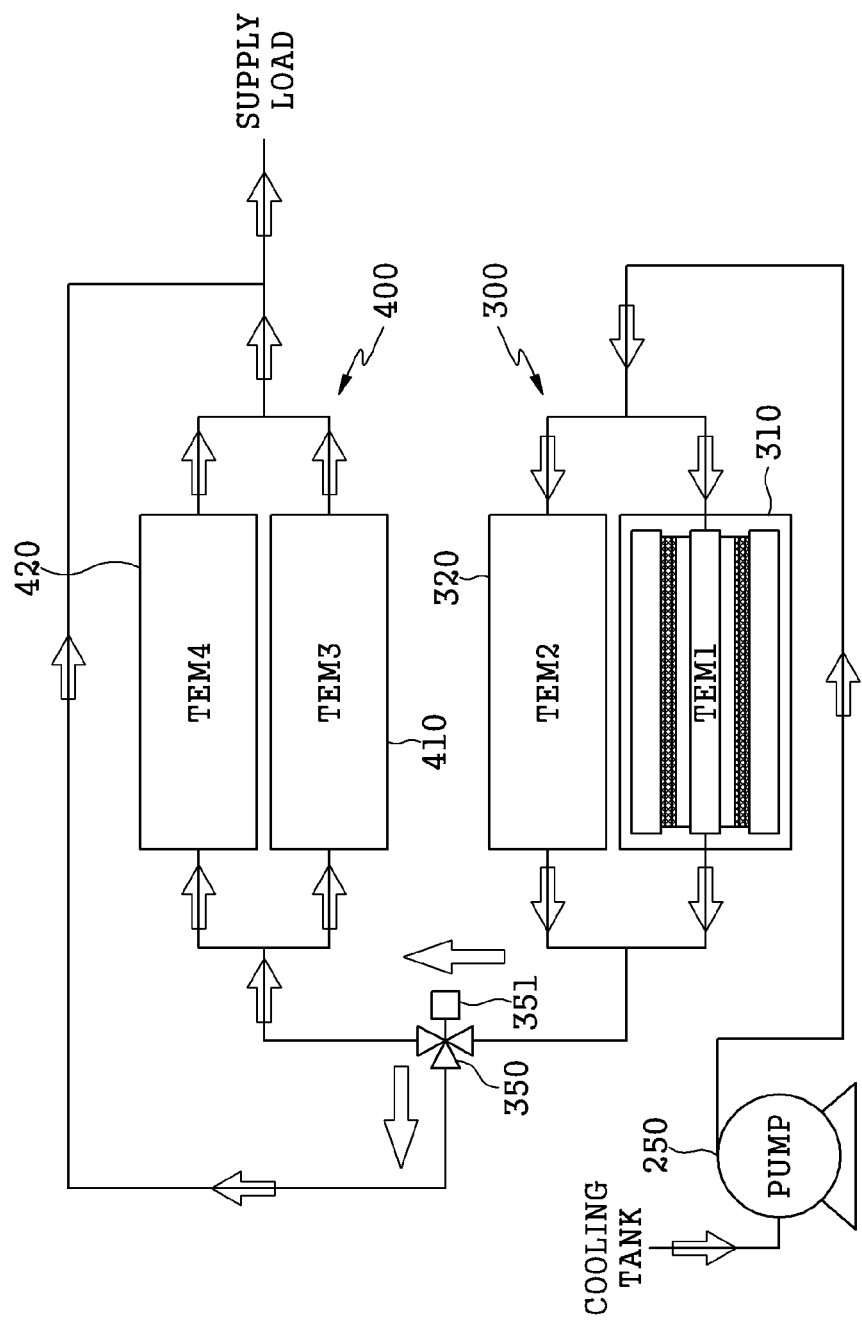
FIG. 4 is a view illustrating a configuration of an operating method of thermoelectric element block groups according to an embodiment of the present invention.

Thus, thermoelectric element blocks are disposed as illustrated in FIG. 4 and are controlled in an appropriate operating manner according to temperature so that an effective response in the high temperature region and effective temperature control in a general region (not in the high temperature region) can be performed.

As illustrated in FIG. 4, a plurality of thermoelectric element blocks are divided into at least two different groups. In the present embodiment, the plurality of thermoelectric element blocks are divided into a first thermoelectric element block group 300 and a second thermoelectric element block group 400.

Figure 5:
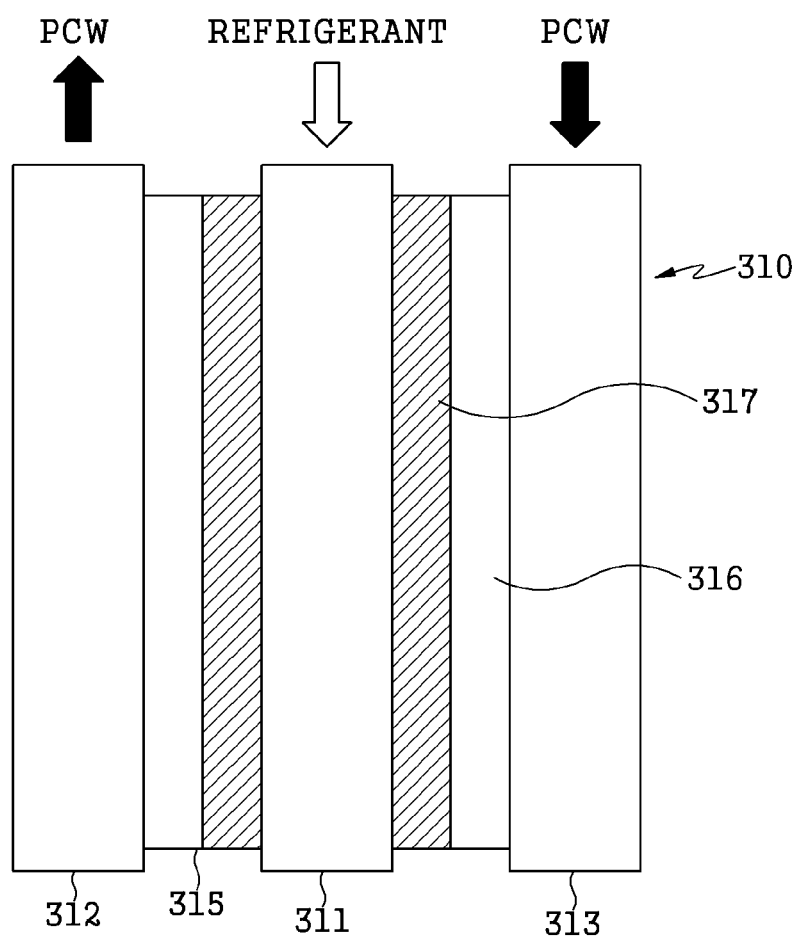
FIG. 5 is a conceptual view for explaining an operating state of a thermoelectric element block for dealing with a high-temperature refrigerant according to an embodiment of the present invention.

The first thermoelectric element block group 300 includes two thermoelectric element blocks 310 and 320. The first thermoelectric element block group 300 is used in the entire temperature range. However, in a pre-set high temperature region (for example, 60° C. or more), a polarity of a control voltage applied to a thermoelectric element is reversed, and the thermoelectric element is fixed in a cooling operation state. That is, since the reversed control voltage is applied to the thermoelectric element even when there is no output, a surface of the thermoelectric element that faces a refrigerant flow passage on which the high-temperature refrigerant passes is fixed in a cooled state and the thermoelectric element is forcibly maintained at a lower temperature than the refrigerant so that deterioration of the thermoelectric element can be prevented. Referring to FIG. 5, for example, in one thermoelectric element block 310 of the first thermoelectric element block group 300, a surface 316 of a thermoelectric element 315 in the vicinity of a refrigerant flow passage 311 through which the refrigerant passes is fixed in a cooled state, an opposite surface 317 to the surface 316 is fixed in a heated state, and the surface 317 fixed in the heated state may be sufficiently cooled by PCW flow passages 312 and 313 so that the thermoelectric element 315 can be maintained at a much lower temperature than the refrigerant.

In the case of the second thermoelectric element block group 400, the temperature of the refrigerant may be lowered when passing through thermoelectric element blocks 410 and 420 that operate as heat exchangers when the refrigerant is at a high temperature. Thus, a driving unit 351 of a refrigerant variable valve 350 is controlled to vary a refrigerant path so that the refrigerant passing through the first thermoelectric element block group 300 may bypass the second thermoelectric element block group 400. Thus, the high-temperature refrigerant is provided directly to the working load without passing through the second thermoelectric element block group 400.

If the temperature of the refrigerant is in a general control temperature state (for example, −10° C. to 60° C.), the refrigerant that passes through the first thermoelectric element block group 300 is provided to the second thermoelectric element block group 400 by an operation of the refrigerant variable valve 350 so that general cooling or heating control can be performed.

Considering the configuration of FIG. 3 described above, control in the high temperature region is performed in such a way that the refrigerant is heated by the heater 210 and cooled by the heat exchanger 220, the first thermoelectric element block group 300 is fixed in a cooling dedicated state, and deterioration of the thermoelectric element caused by the high-temperature refrigerant can be prevented. Thereafter, if the thermoelectric element is stabilized by the heat exchanger 220 at an appropriate temperature, additional cooling may be performed through precise cooling control using the first thermoelectric element block group 300.

As a result, a target temperature can be achieved quickly by heating of the heater 210 and bypassing of the second thermoelectric element block group 400 when high temperature region control is performed. Although only the first thermoelectric element block group 300 corresponding to half of the entire configuration is used for cooling, fast temperature stabilization is performed by the heat exchanger 220 so that rapid temperature control can be performed and the amount of power can be remarkably reduced.

When a setting temperature in the high temperature region is lowered compared to the current temperature and the width of a temperature drop variation is large, a sufficient cooling capacity may not be provided only by the heat exchanger 220. In this case, an output of the first thermoelectric element block group 300 may be increased. In that case, power consumption increases. Thus, in such a situation, the refrigerant variable valve 350 is properly controlled to vary a degree of bypass of the second thermoelectric element block group 400 so that a part of the refrigerant can pass through the second thermoelectric element block group 400 and cooling can be performed through heat exchanging. Here, the refrigerant variable valve 350 may also be effectively controlled using at least one method of PID control. Thus, the second thermoelectric element block group 400 may be used as an auxiliary heat exchanger for supplementing a limitation in the capacity of the heat exchanger 220 in the refrigerant tank 200 so that a necessary output amount of the first thermoelectric element block group 300 can be reduced and a power-saving operation can be performed. Here, the thermoelectric element of the second thermoelectric element block group 400 can also set the polarity of a control voltage to a negative phase and can be set in a cooling dedicated state (when the refrigerant is at a high temperature), and for example, a cooling output may not be provided to the thermoelectric element of the second thermoelectric element block group 400 so that energy efficiency can be maximized. Obviously, the cooling output may be provided to the thermoelectric element of the second thermoelectric element block group 400 as needed so that rapid temperature control can be performed.

Figure 6:
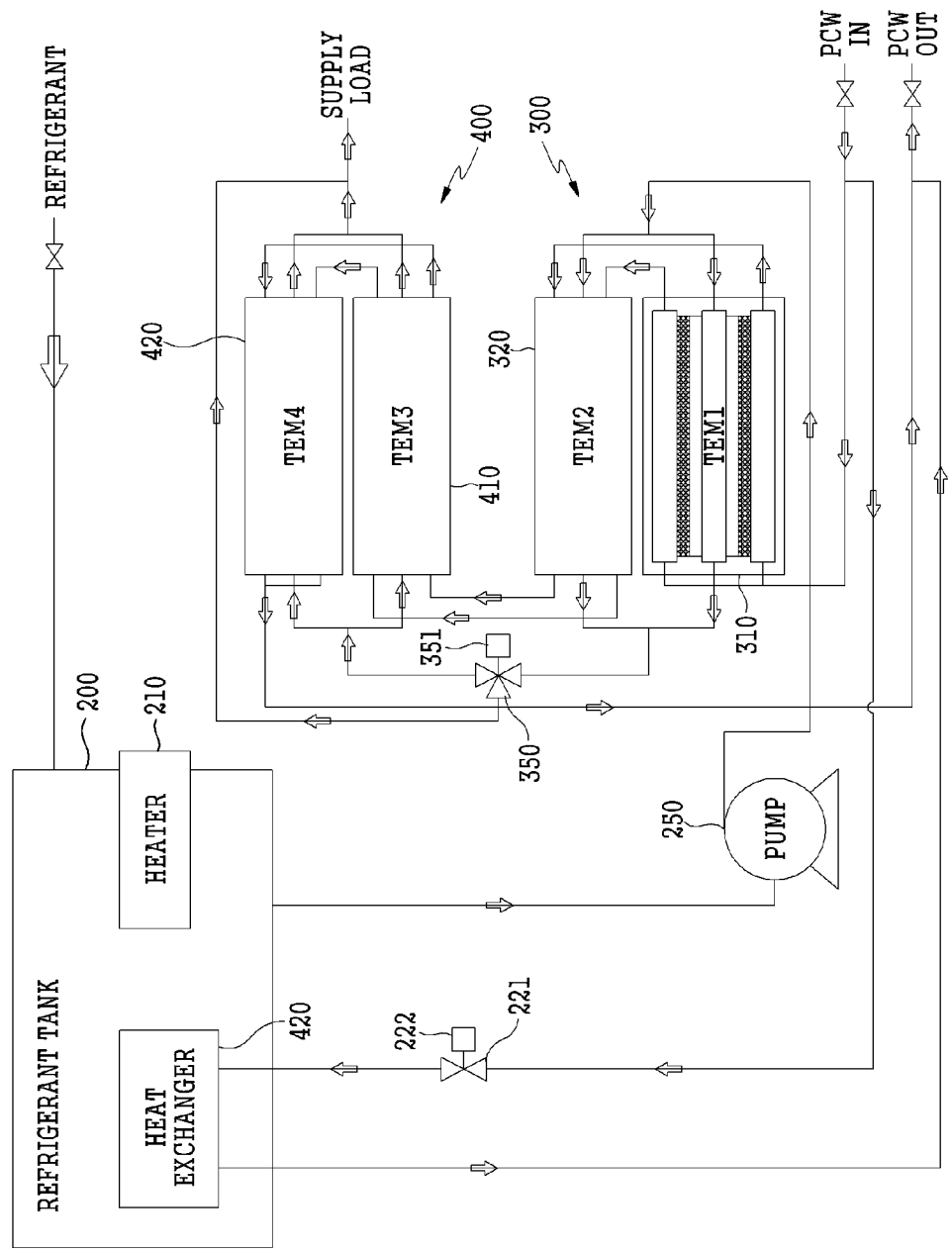
FIG. 6 is a view illustrating a configuration of a temperature control system according to an embodiment of the present invention.

FIG. 6 is an example illustrating a configuration of a substantial chiller that combines the configuration of FIG. 3 and the configuration of FIG. 4 described above. As illustrated in FIG. 6, PCW is configured to pass through thermoelectric element blocks so that the operating temperature of the thermoelectric element can be maintained within the range of an operation of the thermoelectric element and fast temperature control can be performed. A variable valve 221 is selectively provided to the heat exchanger 220 in the refrigerant tank 200 so that the temperature of the refrigerant in the refrigerant tank 200 can be lowered while power consumption is minimized.

Like in the illustrated configuration, the refrigerant that is recirculated after passing through the working load is collected in the refrigerant tank 200, is provided to the first thermoelectric element block group 300 and the second thermoelectric element block group 400 via the circulation unit 250, is temperature-controlled by the first and second thermoelectric element block groups 300 and 400, and then is provided to the working load.

Figure 7:
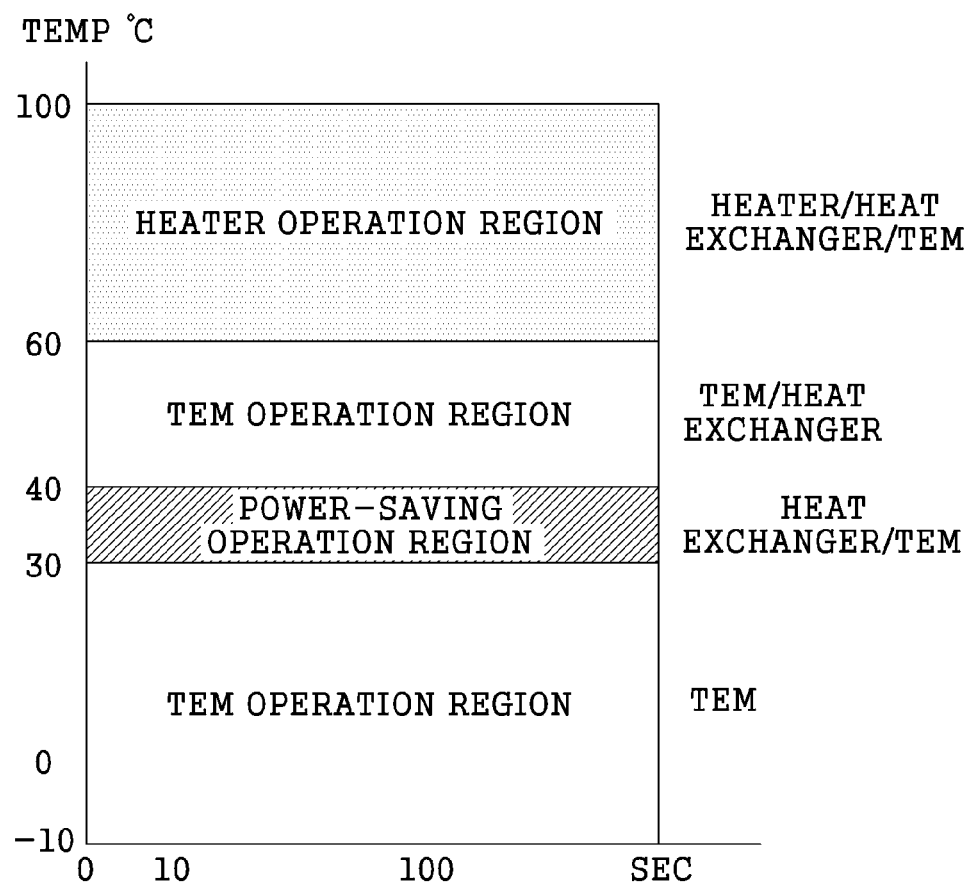
FIG. 7 is an example in which a temperature control range is divided into a plurality of regions according to an embodiment of the present invention.

FIG. 7 shows an example of a temperature control table in which a temperature control range is divided into a plurality of regions according to temperature so as to effectively control a wide range temperature control region using the configuration of the chiller illustrated in FIG. 6. As illustrated in FIG. 7, a high temperature region of 60° C. to 100° C. (obviously, a range that exceeds 100° C. may be controlled, and when a thermoelectric element that can be used at a higher temperature than 100° C. by improving the performance of the thermoelectric element is used, its control range may extend to a higher temperature and 60° C. that is a reference temperature for determining a high temperature may also be increased) is basically determined as a section that is heated by a heater, and cooling in the high temperature region is performed using multiple control using a heat exchanger and thermoelectric element blocks. A region from −10° C. to 60° C. is basically heated and cooled by the thermoelectric element blocks, and temperature stabilization is secondarily performed using the heat exchanger so that power consumption can be reduced.

In case of the refrigerant, the temperature of the refrigerant may be considered to further rise due to a circulation unit in addition to the heater and the thermoelectric element blocks. The temperature of the refrigerant may rise due to the temperature of the circulation unit (the temperature of a pump that is generated by an operation of the pump), and the rise of the temperature of the refrigerant caused by the circulation unit needs to be controlled again by a cooling output of a subsequent thermoelectric element block such that energy consumption occurs. Thus, if a region (30° C. to 40° C.) that is set by considering the range of a heat-exchanging efficiency of the heat exchanger (which is determined in consideration of a PCW temperature and a heat-exchanging ratio, and for example, when the PCW temperature is 20° C. and the heat-exchanging ratio is 10, the temperature of the refrigerant is 30° C. or more) from the range in which the temperature of the refrigerant rises due to the circulation unit (for example, 40° C. or less) is a temperature to be controlled, the temperature of the refrigerant is further lowered and provided by considering the temperature of the refrigerant to rise due to the circulation unit using the heat exchanger so that a cooling output amount of the subsequent thermoelectric element block can be reduced, and thus the region may be additionally controlled as an insulating region.

Figure 8:
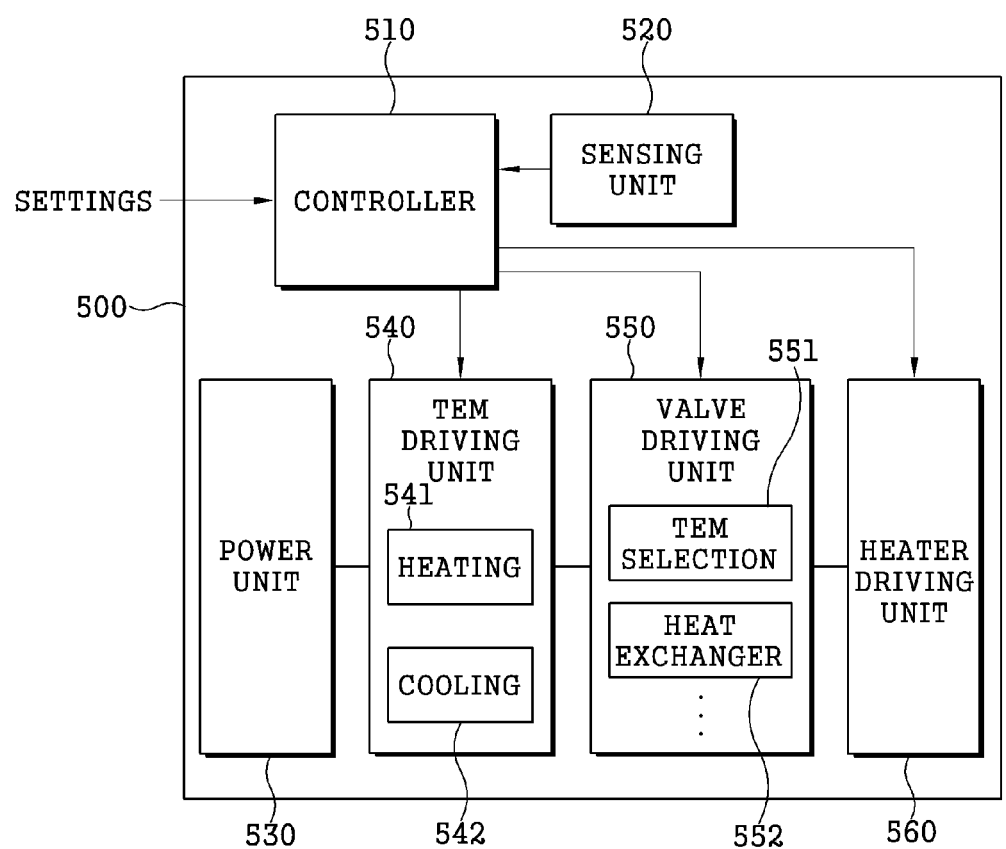
FIG. 8 is a view illustrating a configuration of a temperature controller for controlling the temperature control system illustrated in FIG. 6.

FIG. 8 shows an example of a configuration of a temperature controller for controlling the chiller of FIG. 6 according to an embodiment of the present invention. As illustrated in FIG. 8, the temperature controller includes a controller 510 that receives a setting temperature of a working load and settings regarding whether each controller operates according to each temperature situation and that collects the temperature or operating state information of each control part including the temperature of the working load through a sensing unit 520 so as to control the temperature and to operate a heater, a variable valve and thermoelectric element blocks.

The controller 510 controls the temperature by performing heating and cooling in different manners according to a predetermined control temperature region using various powers provided by a power unit 530. When high temperature heating or a rapid temperature rise is required, the controller 510 operates a heater driving unit 560 to heat a refrigerant in a refrigerant tank, operates a valve driving unit 550 according to a temperature range to bypass a part of thermoelectric element block groups or to operate a heat exchanger, and sets thermoelectric element blocks by changing polarities of the thermoelectric element blocks in a heated or cooled state using a thermoelectric element driving unit 540 according to the temperature range and then determines an output amount.

The valve driving unit 550 may include a thermoelectric element selection unit 551 for controlling the driving unit 351 of the refrigerant variable valve 350 and a heat exchanger controller 552 for controlling a driving unit 222 of the variable valve 221 that determines a degree of heat exchanging of the heat exchanger. The valve driving unit 550 may additionally perform control of a valve that controls supply and recirculation of the PCW and supply and recirculation of the refrigerant.

The thermoelectric element driving unit 540 may include a heating unit 541 that sets the polarity of a control voltage in a forward direction and provides an output according to a control amount and a cooling unit 542 that sets the polarity of the control voltage in a reverse direction and provides an output according to a control amount. An additional power unit SMPS may be provided in an individual thermoelectric element block or a heater.

Consequently, through the temperature controller, in the chiller illustrated in FIG. 6, cooling and heating control is performed in a temperature region controlled by thermoelectric element blocks according to the related art through polarity conversion like in the related art, efficiency can be improved using a heat exchanger and the occurrence of a dead zone can be suppressed, basic temperature control is performed in a high temperature region using the heater and the heat exchanger and a part of thermoelectric element block groups, and precise control is performed through cooling dedicated thermoelectric element block groups so that an optimized control method can be applied to a wide range temperature control region according to region, the entire control can be uniformly performed without temperature division and high control performance can be provided. Also, a complex heating unit and a complex heat-exchanging unit are controlled in a combined manner, power consumption can be suppressed to the maximum and power efficiency can be maximized. Additionally, various heating sources and cooling units are used through a power-saving operation considering a temperature rise caused by a circulation unit, but an output used in temperature control can be drastically reduced.

As described above, in a wide range temperature control system for semiconductor manufacturing equipment using a thermoelectric element according to an embodiment of the present invention, a circulation configuration of a refrigerant is modified in such a way that the refrigerant circulated through a refrigerant tank passes through a plurality of thermoelectric element block groups and is cooling and heating controlled, outputs of the plurality of thermoelectric element block groups are then supplied to a load, a heat exchanger using process cooling water (PCW) is configured in the refrigerant tank in which the refrigerant recirculated from a working load is stored, a heater for high temperature heating is further configured, some of the plurality of thermoelectric element block groups at a high temperature are bypassed through a variable valve, the polarity of a voltage is reversed in the thermoelectric element block groups through which a high-temperature refrigerant passes, and a part of an insulating element adjacent to the refrigerant is maintained at a lower temperature than the refrigerant so that a precise power-saving operation can be performed in a wide range temperature region including high temperature control by using the thermoelectric element that can be precisely controlled and without using an additional cooler having a large volume and a high frequency of occurrence of noise.

In a wide range temperature control system for semiconductor manufacturing equipment using a thermoelectric element according to an embodiment of the present invention, a temperature control range is divided into a plurality of regions and then a control object to be heated or cooled in each of the plurality of regions is changed to cause a control state of each control object to be close to proportional, integral and differential (PID) control having no dead zone so that control performance can be improved.

In a wide range temperature control system for semiconductor manufacturing equipment using a thermoelectric element according to an embodiment of the present invention, temperature stabilization is first performed using a heat exchanger configured in the refrigerant tank and then precise temperature control is performed using the thermoelectric element to enable a power-saving operation so that energy efficiency can be improved.

In a wide range temperature control system for semiconductor manufacturing equipment using a thermoelectric element according to an embodiment of the present invention, a degree of bypass of some of a plurality of thermoelectric element block groups is adjusted by PID control of a variable valve so that the thermoelectric element block groups can be used as an auxiliary heat exchanger to improve a temperature stabilization velocity without providing outputs of the thermoelectric element block groups in which much energy is consumed and temperature control can be performed so that control performance and energy efficiency can be improved.

In a wide range temperature control system for semiconductor manufacturing equipment using a thermoelectric element according to an embodiment of the present invention, a heat exchanger of a refrigerant tank operates so as to compensate for a rise of the temperature of a refrigerant caused by a circulation unit including a pump for circulating the refrigerant without consuming outputs of a plurality of thermoelectric element block groups so that a power-saving operation can be performed.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A wide range temperature control system for semiconductor manufacturing equipment using a thermoelectric element, comprising:
   a refrigerant tank that collects a refrigerant recirculated from a working load in the semiconductor manufacturing equipment;
   a heat exchanger that is disposed in the refrigerant tank and performs heat-exchanging with the collected refrigerant using process cooling water (PCW);
   a heater disposed in the refrigerant tank;
   a circulation unit that circulates the refrigerant collected in the refrigerant tank;
   a first thermoelectric element block group and a second thermoelectric element block group to which the refrigerant circulated through the circulation unit is sequentially applied and which control a temperature of the refrigerant to heat or cool the working load when the refrigerant is provided to the working load;
   a refrigerant variable valve that varies a refrigerant path so as to provide the refrigerant, which passed through the first thermoelectric element block group, to the second thermoelectric element block group in a first state of the refrigerant variable valve, and to at least partially bypass the second thermoelectric element block group in a second state of the refrigerant variable valve; and
   a temperature controller that divides a temperature control region into a divided temperature control region having a plurality of regions, and controls an operation of the heat exchanger, a temperature-control output of the heater, polarities of the first and second thermoelectric element block groups, and temperature-control outputs of the first and second thermoelectric element block groups according to the divided temperature control region in different manners based on a setting temperature and an actual temperature of the working load,
   wherein, when a control temperature is a high temperature of more than a pre-set temperature, the temperature controller performs temperature control of the refrigerant using the heater, the heat exchanger and a first thermoelectric element of the first thermoelectric element block group, bypasses the second thermoelectric element block group through the refrigerant variable valve and reverses a polarity of a control voltage applied to the thermoelectric element of the first thermoelectric element block group so as to fix the thermoelectric element of the first thermoelectric element block group into a cooling state.

2. The wide range temperature control system of claim 1, wherein the pre-set temperature, which is for determining the high temperature, is 60° C.

3. The wide range temperature control system of claim 1, wherein, when the pre-set temperature is lower than an actual temperature of the refrigerant, the temperature controller stabilizes the actual temperature of the refrigerant using the heat exchanger and performs temperature control using at least one of the first thermoelectric element block group and the second thermoelectric element block group.

4. The wide range temperature control system of claim 1, wherein the temperature controller uses the second thermoelectric element block group as an auxiliary heat exchanger for assisting a function of the heat exchanger by controlling the refrigerant variable valve to be in the first state.

5. The wide range temperature control system of claim 4, wherein the temperature controller
   controls an opening/closing amount of the refrigerant variable valve using at least one of proportional, integral and differential (PID) operations, and
   performs heat exchanging, that exceeds a capacity of the heat exchanger, through the second thermoelectric element block group, by controlling a polarity of a control voltage applied to a thermoelectric element of the second thermoelectric element block group to be reversed so that the thermoelectric element of the second thermoelectric element block group is fixed in a cooled state.

6. The wide range temperature control system of claim 1, wherein, in a pre-set control temperature range, the temperature controller performs a power-saving operation so as to compensate for a rise of a temperature of the refrigerant, which is caused by the circulation unit, by operating the heat exchanger.

7. The wide range temperature control system of claim 1, wherein, in a high temperature region of more than the pre-set temperature, the temperature controller uses the heater during heating and uses the heat exchanger and the first thermoelectric element block group for cooling.

8. The wide range temperature control system of claim 7, wherein, for the cooling, the second thermoelectric element block group is fixed to a cooling polarity having no output and is further used as an auxiliary heat exchanger that supplements a capacity of the heat exchanger through the refrigerant variable valve.

9. A wide range temperature control system for semiconductor manufacturing equipment using a thermoelectric element, comprising:
   a refrigerant tank that collects a refrigerant recirculated from a working load in the semiconductor manufacturing equipment;
   a controller that
       performs temperature stabilization so that a temperature of the refrigerant is able to be close to a target temperature using a heat exchanger using process cooling water (PCW) and which is disposed in the refrigerant tank, and
       selectively performs heating for the target temperature using a heater disposed in the refrigerant tank;

a first thermoelectric element block group that cools or heats the refrigerant collected in the refrigerant tank;

a second thermoelectric element block group that selectively receives the refrigerant, which passed through the first thermoelectric element block group to cool or heat the refrigerant and to provide the cooled or heated refrigerant to a working load; and a refrigerant variable valve that controls a flow of the refrigerant so that the refrigerant, which passed through the first thermoelectric element block group, selectively passes through the second thermoelectric element block group or bypasses the second thermoelectric element block group, wherein, when a control temperature of the refrigerant is a pre-set temperature or more, the controller controls the heater to heat the refrigerant while reversing a polarity of the first thermoelectric element block group to place the first thermoelectric element block group in a cooling operation state, wherein the controller controls the refrigerant variable valve so that when the control temperature is less than the pre-set temperature, at least a portion of the refrigerant, which passed through the first thermoelectric element block group, selectively passes through the second thermoelectric element block group to cool or heat the refrigerant, and when the control temperature is at the pre-set temperature or more, at least a part of the refrigerant bypasses the second thermoelectric element block group.

10. The wide range temperature control system of claim 9, wherein the pre-set temperature is 60° C.

11. The wide range temperature control system of claim 9, wherein, when a setting temperature of the refrigerant to be applied to the working load is lower than an actual temperature of the refrigerant, the controller controls the heat exchanger so that the heat exchanger in the refrigerant tank operates and stabilizes a temperature of the refrigerant, and after the temperature of the refrigerant is stabilized, the heat exchanger in the refrigerant tank performs temperature control at the setting temperature while using at least one of the first thermoelectric element block group and the second thermoelectric element block group.

12. The wide range temperature control system of claim 9, wherein, when a capacity of the heat exchanger in the refrigerant tank is insufficient during cooling control, the temperature controller controls the refrigerant variable valve so that a degree of refrigerant that bypasses the second thermoelectric element block group is adjusted so that the second thermoelectric element block group is able to be used as an auxiliary heat exchanger for assisting a function of the heat exchanger.

13. The wide range temperature control system of claim 12, wherein the controller controls a control voltage applied to a thermoelectric element of the second thermoelectric element block group to be fixed to a reversed polarity so that the thermoelectric element of the second thermoelectric element block group is in a cooling dedicated state.

14. The wide range temperature control system of claim 13, wherein, when the second thermoelectric element block group is used as an auxiliary heat exchanger, the second thermoelectric element block group does not provide an output.

15. The wide range temperature control system of claim 9, wherein, in a high temperature region of more than the pre-set temperature, the controller controls the heater to be used during heating, and the heat exchanger and the first thermoelectric element block group to be used for cooling.

16. The wide range temperature control system of claim 15, wherein, for the cooling, the controller controls the second thermoelectric element block group to be fixed to a cooling polarity having no output, causes the refrigerant to pass through the second thermoelectric element block group via the refrigerant variable valve, that adjusts a degree of bypass of the refrigerant of the second thermoelectric element block group, and causes the second thermoelectric element block group to be used as an auxiliary heat exchanger that supplements a capacity of the heat exchanger.

17. The wide range temperature control system of claim 16, wherein, at less than the pre-set temperature, the first thermoelectric element block group and the second thermoelectric element block group perform a heating or cooling operation in the same mode.

18. The wide range temperature control system of claim 17, wherein, when both the control temperature is less than the pre-set temperature and an absolute value of a difference between the control temperature and an actual temperature is greater than or equal to a predetermined value, a rapid temperature rise or drop is performed by the heater or the heat exchanger.

19. The wide range temperature control system of claim 17, further comprising a circulation unit for circulating the refrigerant between the refrigerant tank and the first thermoelectric element block group, wherein the heat exchanger operates and performs a power-saving operation so as to compensate for a rise of a temperature of the refrigerant caused by the circulation unit in a pre-set control temperature range.

* * * * *